May 22, 1934.   LA RUE B. CHEVALIER   1,959,570
BULL AND CALF WHEEL
Filed May 22, 1933
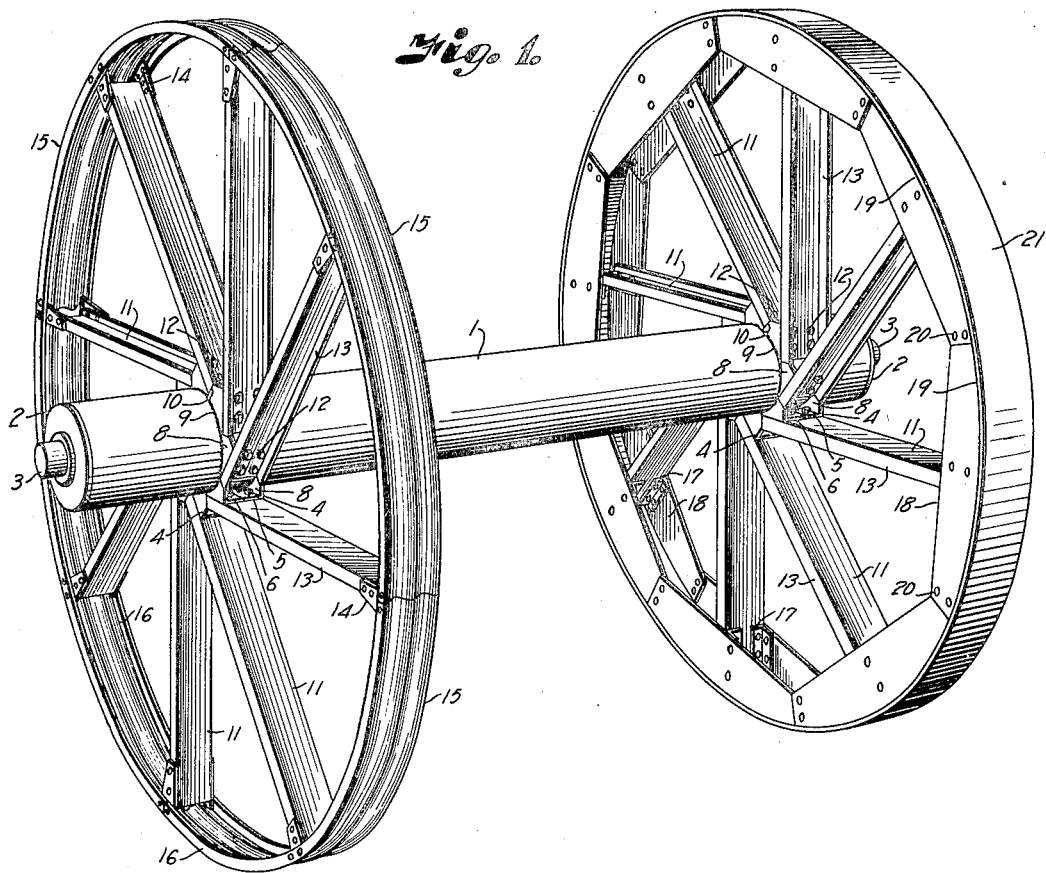
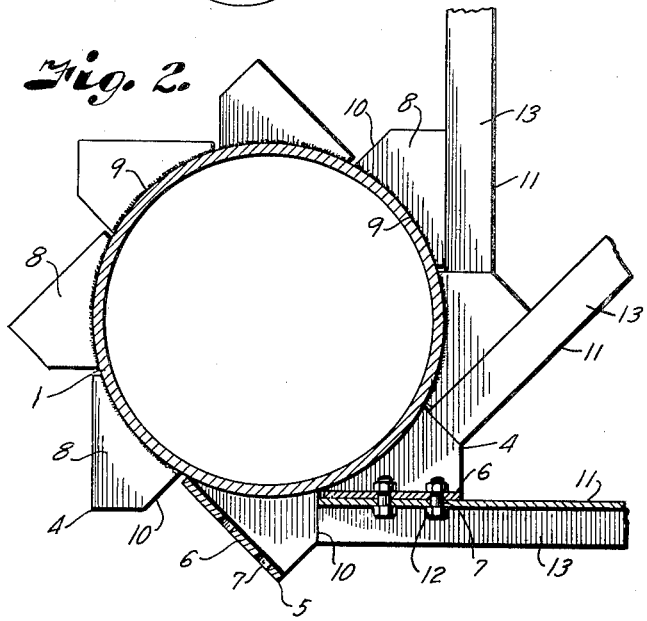
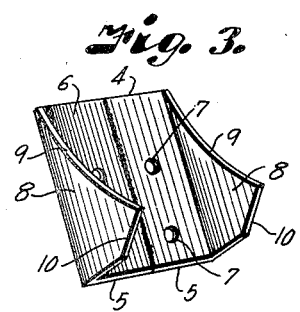
INVENTOR
La Rue B. Chevalier
BY
ATTORNEY Patented May 22, 1934

1,959,570

UNITED STATES PATENT OFFICE 1,959,570

BULL AND CALF WHEEL

La Rue B. Chevalier, Iola, Kans.

Application May 22, 1933, Serial No. 672,257

6 Claims. (Cl. 242—117)

This invention relates to improvements in bull and calf wheels, and more particularly to the hub and spoke construction which is such that a smooth surface is provided at the hubs and spokes of the tug and brake wheels for contact of the cable, and, by eliminating sharp corners and crevices, prevents injury to the cables wound against the wheels.

Bull and calf wheels made according to my invention are especially adapted for drill rigs used in oil, gas and water well drilling, as the tug and brake wheels and the spokes can be readily dismantled and reassembled, conserving space when shipping, and, being made of structural steel, a very strong structure results.

Another important feature of my construction is that the bull and calf wheels are of lighter weight than those of ordinary construction and, therefore, a reduction in transportation charges for moving the rig from job to job is made possible.

In accomplishing these and other objects of the invention, I have provided improved details of structure, the preferred forms of which are illustrated in the accompanying drawing, wherein:

Fig. 1 is a perspective view of a bull wheel constructed according to my invention.

Fig. 2 is an enlarged end view of the hub with parts in section showing the manner of attaching the spokes thereto.

Fig. 3 is a perspective view of one of the hub sections showing its construction.

Referring to the drawing in detail:

1 represents a drum which is made from a piece of tubing of the desired diameter and length. Secured in each end of the tube 1 are members or plugs 2 which are provided with trunnions 3 serving as journals for the tube.

Secured to and around the tube 1, and spaced inwardly from its ends, are hub sections 4 which are preferably composed of angle bars having their flanges 5 abutting and welded together, to form a plate 6 which is provided with openings 7 for the passage of bolts, as will be hereafter described.

The flanges 8 of the angle bars have portions cut away so as to form arcuate edges which fit against the drum 1, so that the plates 6 will be arranged tangentially to the tube and that portion of each flange 8 adjacent the arcuate edge 9 is cut at such an angle that the edges 10 formed by such angular cutting will be at right angles to the plane of an adjacent plate 6 and thus form an abutment for the inner ends of the spokes 11 at a point short of the tangent point of the tangential planes of the plates 6. The spokes 11 are preferably formed of channel bars and provided with openings registering with the openings 7 in the plates 6 and through which bolts 12 are passed so that the spokes may be removably secured to the hub sections 4 with their ends abutting the edges 10 of an adjacent section so that leverage strains acting on one spoke will not act directly against either adjacent spoke.

The hub sections are arranged in the form of a ring around the tube 1 and have their arcuate edges welded thereto.

Thus far the construction of the tug and brake wheels is identical, and I will now describe the completion of the tug and brake wheels separately.

Secured to the flanges 13 of the spokes 11 of the tug wheel are plates 14 which project beyond the ends of the spokes 11 and which have one inclined edge so that the projecting ends are widened and provide space for several rivet holes.

The rim of the tug wheel is composed of sections 15 having inwardly extending flanges 16, and it is to these flanges that the plates 14 are secured. The sections 15 have their adjacent ends abutting and are preferably butt welded at these points. The rim may be grooved as shown in Fig. 1 when a rope drive is used, or made smooth for a belt drive.

Secured to the web of each of the spokes 11 of the brake wheel, and at the ends thereof, are angles 17 which have their free portions flush with the outside of the flanges 13 of the spokes 11, and secured to the angles 17 are plates 18 which have their outer edges curved as at 19. The ends of adjacent plates overlap and securing means 20, such as rivets or the like, secure these lapped ends together. The plates when assembled have their curved or arcuate edges 19 form complete circles, and extending around these circles and resting on the edges 19 of the plates 18 is a band or rim 21 which is preferably held in place by welding and which provides the braking surface for the brake wheel.

The construction of the calf wheel is identical with that of the bull wheel just described except as to size and, therefore, it will not be necessary to describe the construction thereof.

When it is desired to transport the device to another location, the bolts 12 are removed, after which the spokes and rims carried thereby can be removed from the hubs. Thus it will be seen that bull and calf wheels made according to my invention can be packed in a much smaller space and be more readily handled, by reason of it being a knock-down assembly, than similar structures not having this feature.

It is obvious that the hub sections may be made from channel bars instead of angles, or they may be stamped or cast, without departing from the spirit of my invention, and that the spokes may likewise be made of angle bars instead of channels.

What I claim and desire to secure by Letters Patent is:

1. In combination with a wheel drum, a hub on said drum including a set of individual sections, each having a face curved to the contour of the wheel drum and a flat face extending in a plane tangential to the drum and having an abutment portion extending transversely of the flat face of an adjacent section, spokes attached to the flat faces of said sections and terminating in end abutment with the abutment portions of adjacent sections at a point short of the tangent point of said tangential plane whereby leverage strains exerted upon one spoke are independent of the leverage strains on adjacent spokes, and a rim carried by said spokes.

2. A wheel of the character described including a drum, a hub comprising angular sections having base members extended tangentially to the drum and side members curved to the contour of and secured to the drum, the side members having abutment portions extended transversely to the base members of adjacent sections, spokes secured to said base members and abutting said abutment portions, and a rim carried by said spokes.

3. A wheel of the character described including a drum, a hub comprising angular sections having base members extended tangentially to the drum and side members curved to the contour of and secured to the drum, the side members having abutment portions extended transversely to the base members of adjacent sections, spokes having back portions secured to the base members of the hub sections, and a rim mounted on said spokes.

4. A wheel of the character described including a drum, a hub comprising angular sections having base members extended tangentially to the drum and side members having edge portions curved to the contour of and secured to the drum, the side members having abutment portions extended transversely to the base members of adjacent sections, spokes having back portions secured to the base portions of the hub sections and side flanges extended in the plane of the side members of said sections, and a rim mounted on said spokes.

5. A wheel of the character described including a drum, a hub comprising angular sections having base members extended tangentially to the drum and side members having edge portions curved to the contour of the drum, edge portions constituting abutments for the wheel spokes and edge portions extending at right angles from the base portions to juncture with spokes having end abutment with said abutment portions, spokes attached to said base portions in end abutment with said abutment portions, and a rim mounted on said spokes.

6. A wheel of the character described including a drum, a hub comprising individual sections having flat spoke attaching portions extending tangentially to the drum and having side flange portions provided with curved edges corresponding to the contour of the drum and having end edges forming abutment portions extending transversely of the flat spoke attaching portions of an adjacent section, spokes attached to the flat spoke attaching portions and having integral side flanges abutting squarely against said abutment portions of adjacent sections, and a rim carried by said spokes.

LA RUE B. CHEVALIER.